Patented Jan. 5, 1954

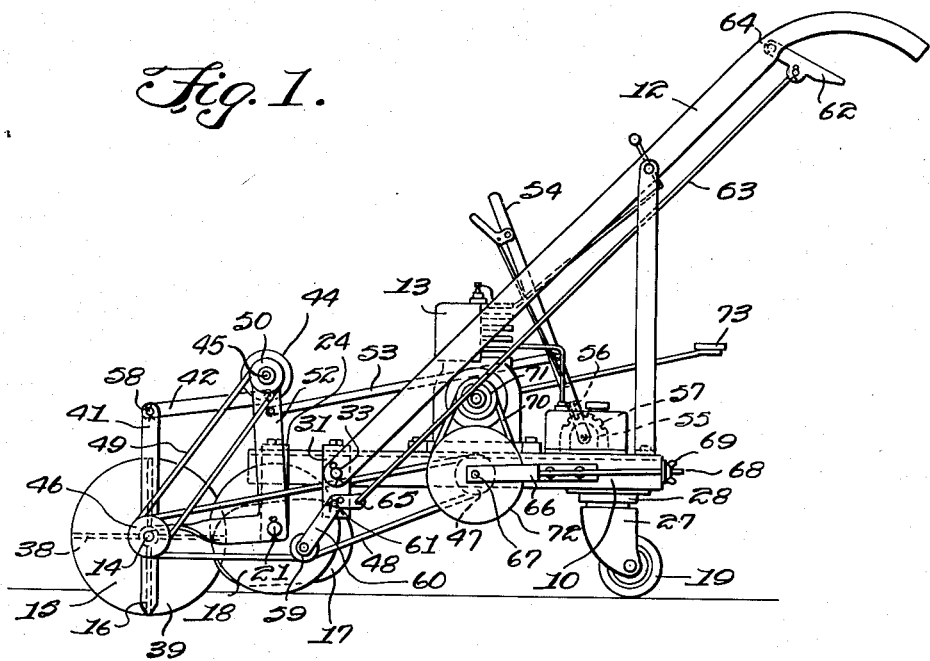

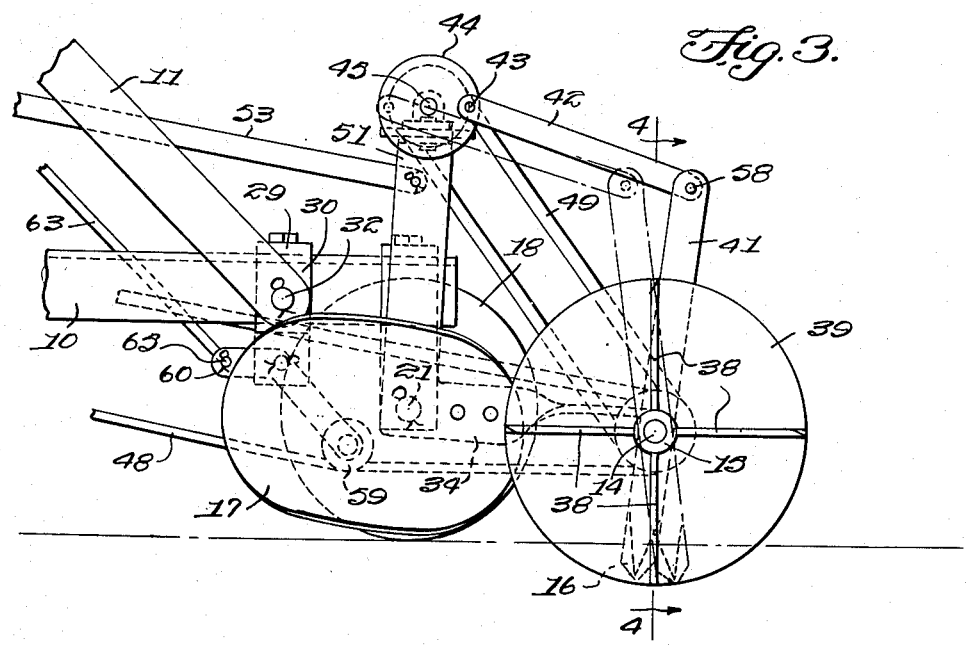

2,664,807

UNITED STATES PATENT OFFICE 2,664,807

MOTOR PROPELLED LAWN EDGER

William R. Hedrick, Knoxville, Tenn.

Application February 6, 1950, Serial No. 142,588

1 Claim. (Cl. 97—227)

This invention relates to a lawn trimming and edging machine and in particular a motor actuated reciprocating blade in combination with a triangular shaped cutting element with the parts adjustably mounted on a platform with a supporting roller at the forward end and a caster type of roller at the rear.

The purpose of this invention is to provide a device for cutting grass at the edge of a sidewalk which also forms a small trough or gutter at the edge of the sidewalk and at the same time disperses cut grass and soil removed from the gutter.

Various types of lawn edgers have been provided but it has been found difficult to provide a power actuated machine or tool that cuts the grass and at the same time forms a clean trough or gutter at the edge of the sidewalk. With this thought in mind this invention contemplates an edger having a conical shaped cutting element with radially disposed blades thereon in combination with a vertically positioned knife and a frame on which the elements are carried and in which means is provided for reciprocating the knife and rotating the cutter.

The object of this invention is, therefore, to provide means for forming and actuating a plurality of cutting elements whereby a clean trough or gutter is formed at the edge of a sidewalk or the like.

Another object of the invention is to provide a lawn edger for forming a clean trough at the edge of the sidewalk in which the parts are adjustable.

A further object of the invention is to provide a lawn edger for cutting the grass extended over a sidewalk and at the same time forming a clean trough at the edge of the sidewalk which is of a simple and economical construction.

With these and other objects and advantages in view the invention embodies a horizontally disposed platform having handles extended upwardly therefrom with a motor mounted on the platform, wheels for supporting the platform, and a shaft adjustably mounted on the forward end of the platform and provided with a rotating cutter element and a reciprocating cutting element whereby the devices operate to form a clean trough at the edge of a sidewalk as the device travels along the sidewalk.

Other features and advantages of the invention will appear from the following description taken in connection with the drawings wherein:

Figure 1 is a view showing a side elevation of the edger.

Figure 2 is a plan view of the edger.

Figure 3 is a side elevational view on an enlarged scale looking toward the opposite side of the edger mounting from that shown in Figure 1, and illustrating the movement of the reciprocating blade in combination with the rotary cutter.

Figure 4 is a cross section taken on line 4—4 of Figure 3 illustrating the mounting of the cutting element.

Figure 5 is also a cross section through the forward part of the edger showing the ground engaging roller and the mounting therefor.

Referring now to the drawings wherein like reference characters denote corresponding parts, the improved edger of this invention includes a platform 10 having handles 11 and 12, a motor 13 positioned on the platform, a shaft 14 on which the rotating cutter 15 and also the reciprocating blade 16 are carried, a deflector 17, a ground engaging roller 18 and a caster 19.

The platform 10 is carried by the roller 18 and the caster roller 19 and, as illustrated in Figure 5, the roller 18 is journaled through a tube 20 on a shaft 21 and the shaft is carried on the lower ends of arms 22 and 23 of a yoke 24 that is secured to the forward end of the platform by bolts 25 and 26.

The caster roller 19 is journaled in the lower end of the arms of a bracket 27 and the bracket is pivotally mounted through a base 28 on the lower surface of the platform 10.

The platform 10 is also provided with a U-shaped bracket 29 and the bracket is provided with downwardly extended ends 30 and 31 to which the handles 11 and 12 are connected by bolts 32 and 33, respectively.

The lower ends of the arms 22 and 23 of the yoke 24 are provided with outwardly extended sections 34 and 35, the outer ends of which are twisted and rolled to form bearings 36 and 37, respectively, in which the shaft 14 is journaled.

The rotating cutter 15 which is formed with triangular shaped radially disposed blades 38 mounted on a hub and with the ends secured to a disc 39 is mounted on the outer end of the shaft and the reciprocating cutter blade 16, which is provided with a hub 40 is also journaled on the shaft and the upwardly extended end 41 thereof is connected by a bar 42 to a pin 43 eccentrically positioned on a disc 44 on an upper shaft 45.

The shaft 14 is provided with a double pulley 46 which is driven by a pulley 47 on the motor 13 by a belt 48, and which drives the shaft 45 through a belt 49 which is trained over the pulley 46 and over a pulley 50 on an end of the shaft 45.

The deflector or curved scatterboard 17 is carried by and extended outwardly from the section 34 of the arm 23 of the yoke 24 and with this element positioned as illustrated in Figures 2 and 3 grass, dirt, and the like removed by the rotating cutter 15 are thrown against the curved surface thereof and thereby deflected outwardly or dispersed in substantially small particles over the surface of a lawn.

The outwardly extended sections 34 and 35 are pivotally mounted on the outer ends of the shaft 21 and these sections are integral with upwardly extended bars 51 and 52, in the upper ends of which shaft 45 is journaled. The bar 52 is connected by a link 53 to a hand lever 54 which is pivotally mounted on the platform 10, as shown at the point 55 and this lever, which is provided with a pawl 56 that coacts with a rack 57 provides adjusting means for the elevation of the cutters 15 and 16 in relation to the roller 18. With the bar 42 pivotally connected to the upper end 41 of the cutter 16 by a pin 58 the position of the cutter 16 may also be adjusted without changing the distance the cutter reciprocates.

The belt 48 is provided with a takeup idler 59 that is journaled in the outer end of the bracket 60 which is pivotally mounted on the arm 31 of the bracket 29 by the pin 61 and the position of the idler is adjusted from the handle 12 by a hand lever 62 through a rod 63. The lever 62 is pivotally mounted on the handle 12 by a pin 64 and the lower end of the rod 63 is connected to the bell crank at the point 65.

The pulley 47 is mounted in a sliding bracket 66 by a shaft 67 and the position of the bracket is controlled by an adjusting screw 68 with a thumb nut 69 thereon. The shaft 67 is rotated from the motor 13 by a belt 70 that is trained over pulleys 71 and 72.

The motor 13 is provided with a starting pedal or lever 73, as shown.

With the parts arranged in this manner the device is moved along the edge of a sidewalk with the reciprocating knife 16 positioned against the sidewalk for cutting grass extended over the walk and with the reciprocating cutter in this position the rotating cutter 15 cuts grass and removes soil from a groove or gutter at the edge of the walk.

It will be understood that modifications may be made in the design and arrangement of the parts without departing from the spirit of the invention.

What is claimed is:

In a lawn edger, the combination which comprises a platform mounted on wheels, a motor mounted on the platform, a pair of arms pivotally mounted on the platform and extended from the forward end thereof, a cutter shaft journaled in the extended ends of the arms, a conical shaped cutter including a disc with triangular shaped radially disposed cutting blades on the outer face thereof carried by an extended end of the cutter shaft, a vertically disposed reciprocating cutter blade pivotally mounted on the cutter shaft and positioned against the inner face of the disc of the cutter whereby the lower end of the blade coacts with the conical shaped cutter to form a trench, an upstanding member on each of the arms, means connected to one of said upstanding members for actuating the arms to adjust the elevation of the shaft for adjusting the position of the mounting elements, means connected between the shaft and the motor for rotating the conical shaped cutter, an upper shaft journalled in said upstanding members and positioned parallel to the cutter shaft, a disc having a pin eccentrically positioned thereon and carried by the upper shaft, a bar connecting the eccentrically positioned pin to the upper end of the vertically disposed reciprocating cutter blade for actuating the said reciprocating blade, means driving the upper shaft from the cutter shaft, and an arcuate deflector blade mounted on one side of the platform and positioned to follow the cutter elements for dispersing material removed by the said elements.

WILLIAM R. HEDRICK.

References Cited in the file of this patent

UNITED STATES PATENTS

| Number | Name | Date |
| --- | --- | --- |
| 1,337,076 | Jones | Apr. 13, 1920 |
| 1,644,068 | McBride | Oct. 4, 1927 |
| 2,088,534 | Pittman | July 27, 1937 |
| 2,515,732 | Parry | July 18, 1950 |
| 2,521,033 | Bell | Sept. 5, 1950 |